United States Patent [19]

Chao

[11] Patent Number: 5,161,607
[45] Date of Patent: Nov. 10, 1992

[54] THERMAL STORAGE DEVICE FOR INTERACTING WITH A CIRCULATING COOLANT IN AN AIR CONDITIONING SYSTEM

[76] Inventor: Wen-Hua Chao, 5F, No. 52, Tung-Feng St., Taipei City, Taiwan

[21] Appl. No.: 746,835

[22] Filed: Aug. 19, 1991

[51] Int. Cl.$^5$ .................. F28D 20/00; F25D 17/02
[52] U.S. Cl. ...................................... 165/10; 62/430; 62/437; 62/530
[58] Field of Search .............. 165/10; 62/430, 435, 62/437, 529, 530; 126/436

[56] References Cited

U.S. PATENT DOCUMENTS

| | | | |
|---|---|---|---|
| 2,152,467 | 3/1939 | Crosby | 62/530 |
| 3,773,031 | 11/1973 | Laing et al. | 62/430 |
| 4,827,735 | 5/1989 | Foley | 62/430 |
| 5,036,904 | 8/1991 | Kanda et al. | 165/10 |

Primary Examiner—Albert W. Davis, Jr.
Attorney, Agent, or Firm—Panitch Schwarze Jacobs & Nadel

[57] ABSTRACT

A thermal storage device interacting with a circulating coolant in an air conditioning system is disclosed. The thermal storage device includes a hollow ball containing a liquid to be frozen by the circulating coolant. A generall ball-shaped flexible air pocket is disposed in the hollow ball. An elongated weight member has one end connected to the air pocket and the other end extended to the internal face of the hollow ball, so that the center of the air pocket can be kept in the geometrical center of the hollow ball. The elongated weight member has a predetermined weight so that the total weight of the hollow ball, the air pocket and the elongated weight member is greater than the buoyancy force exerted on the hollow ball by the recirculating coolant. Therefore, the thermal storage device can always be submerged in the recirculating coolant and thus achieve a good heat transfer effect.

2 Claims, 1 Drawing Sheet

THERMAL STORAGE DEVICE FOR INTERACTING WITH A CIRCULATING COOLANT IN AN AIR CONDITIONING SYSTEM

BACKGROUND OF THE INVENTION

1. Field of the Invention

This invention relates to a thermal storage device which interacts with a circulating coolant in an air conditioning system, and more particularly to an ice thermal storage device including a hollow ball containing a liquid and an elongated weight member connected to a ball-shaped flexible air pocket which keeps said air pocket in the geometrical center of the hollow ball.

2. Description of the Related Art

For air conditioning systems that operate only by day, water recirculated and cooled over ice offers an economical means for space cooling. Cold water is pumped from a reservoir having a plurality of thermal storage containers which contains ice. In such an air conditioning system, excess electric power at night is used to cool the recirculating brine, thereby freezing the water in the thermal storage balls to ice by a heat transfer process. The ice in the thermal storage containers chills the recirculating brine. This chilled recirculating brine is used for air cooling purposes by day during which time electric power may be insufficient. This concept may shift the electric load from peak to off-peak to level the power demand. We named it as "Ice Thermal Storage Air Condition".

In the past, to prevent the thermal storage containers from being deformed by the expansion of ice, many types of thermal storage containers have been developed. One type of a thermal storage container is a casing formed with pleated walls. However, the uneven surface of the pleated walls of the container increases the friction force between the recirculating brine and the container, thereby increasing the power consumption.

Referring to FIG. 1, an improved conventional thermal storage ball 10 includes a ball-shaped flexible air pocket 12 and a liquid 11 which is contained therein to be frozen. The thermal storage ball has a smooth surface which can reduce the friction force between the recirculating brine and the ball. A plurality of ribs 13 are connected to the air pocket 12 and extend to the internal face of the ball 10 in order to keep the air pocket in the center of the thermal storage ball 10 where the liquid 11 is gradually frozen. The air pocket 12 contorts inwardly and uniformly to prevent the deformation of the thermal storage ball 10 when the liquid 11 is frozen and expends in volume. However, since the thermal storage ball 10, the air pocket and the ribs 13 are usually made of light plastic materials for the ease of manufacturing, the thermal storage ball 10 will submerge partially into the recirculating brine. Unfortunately, this will reduce the heat transfer efficiency between the circulating brine and the liquid 11 contained in the thermal storage balls 10. In addition, the mounting of many ribs 13 to the air pocket 12 in order to keep the air pocket 12 in the center of the thermal storage ball 10 during the heat transfer process is troublesome and not cost-effective.

SUMMARY OF THE INVENTION

It is therefore an object of this invention to provide a thermal storage device which can always be in the circulating coolant of an air conditioning system in order to achieve good heat transfer efficiency.

It is another object of this invention to provide a thermal storage device having a supporting device which is simple to mount and is cost-effective, and which keeps the air pocket in the center of the thermal storage device.

It is still another object of this invention to provide a thermal storage device which may not change the volume and the physical dimension of the phase change mode.

Accordingly, the thermal storage device interacting with the circulating coolant in an air conditioning system of this invention includes hollow ball containing a liquid to be frozen by the circulating coolant. A generally ball-shaped flexible air pocket is disposed in the hollow ball. An elongated weight member has one end connected to the air pocket and the other end extended to the internal face of the hollow ball, so that the center of the air pocket can be kept in the geometrical center of the hollow ball no matter how the external container turns. The elongated weight member has a predetermined weight so that the total weight of the hollow ball, the air pocket and the elongated weight member is slightly greater than the buoyancy force exerted on the hollow ball by the recirculating coolant. Therefore, the thermal storage device of this invention can always be submerged in the recirculating coolant and thus achieve a good heat transfer effect. In addition, the elongated weight member which keeps the air pocket in the center of the hollow ball is simple to mount, cost-effective, and does not need any mechanical support.

BRIEF DESCRIPTION OF THE DRAWINGS

Other features and advantages of this invention will become apparent in the following detailed description of a preferred embodiment of this invention with reference to the accompanying drawings, in which.

DETAILED DESCRIPTION OF THE PREFERRED EMBODIMENT

Figure 1:
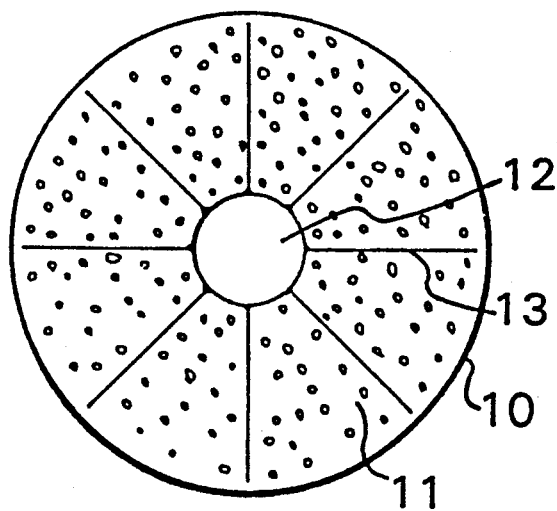
FIG. 1 is a schematic view showing a conventional thermal storage ball for an air conditioning system.
Figure 2:
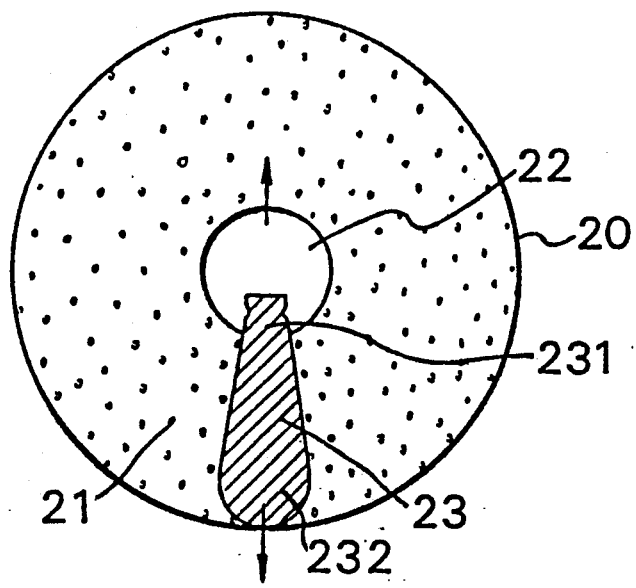
FIG. 2 is a schematic view showing a preferred embodiment of a thermal-storage device of this invention.

Referring to FIG. 2, a preferred embodiment of a thermal storage device interacting with a recirculating coolant, which shows for example, saline water in an air conditioning system including a hollow ball 20 containing water 21 to be frozen by the circulating coolant. the hollow ball 20 is made of a plastic material. A generally ball-shaped flexible air pocket 22 is disposed in the hollow ball 20. The volume ratio of the air pocket 22 is determined by the volume changes before and after the water 21 in the hollow ball 20 is frozen. A generally cylindrically elongated weight member 23 with a predetermined weight is gradually increased on diameter from a first end 231 to a second end 232, serving as a plummet. The first end 231 of the elongated weight member 23 is connected to the air pocket 22 and the second end 232 extends to rest on the internal face the hollow ball 20, so that the center of the air pocket 22 can be kept in the geometrical center of the hollow ball 20. The predetermined weight of the elongated weight member 23 is designed to enable the total weight of the hollow ball 20, the air pocket 22 and the elongated weight member 23 to be greater than the buoyancy force exerted on the hollow ball 20 by the recirculating coolant. Therefore, the thermal storage device of this invention can always be submerged in the recirculating coolant and thus the overall external surface of the hollow ball 20 can be effective in the heat transfer process, achieving a good heat transfer effect. In addition, the air pocket 22 can always be maintained in the geometrical center of the hollow ball 20 because of the downward force exerted by the elongated weight member 23 when the water 21 is frozen which deforms the air pocket 22 and even the hollow ball 20 is rotated. It is noted that the elongated weight member 23 of this invention is simple in construction, reducing the manufacturing cost and time.

With this invention thus explained, it is apparent that numerous modifications and variatios can be made without departing from the scope and spirist of this invention. It is therefore intended that this invention be limited only as indicated in the appended claims.

I claim:

1. A thermal storage device interacting with a circulating coolant in an air conditioning system comprising:
   a hollow ball containing a liquid to be frozen by said circulating coolant, said hollow ball having a geometrical center;
   a generally ball-shaped flexible air pocket disposed in said hollow ball; and
   an elongated weight member having one end connected to said air pocket and the other end extending to an internal face of said hollow ball, so that the center of said air pocket can be kept in said geometrical center of said hollow ball, said elongated weight member being provided with a predetermined weight so that the total weight of said hollow ball, said air pocket and said elongated weight member is greater than the buoyancy force exerted on said hollow ball by said recirculating coolant.

2. A thermal storage device as claimed in claim 1 wherein said hollow ball is made of a plastic material.

* * * * *